June 21, 1932.  J. L. TWENTYMAN  1,864,382
POTATO DIGGER
Filed Feb. 8, 1929   3 Sheets-Sheet 1
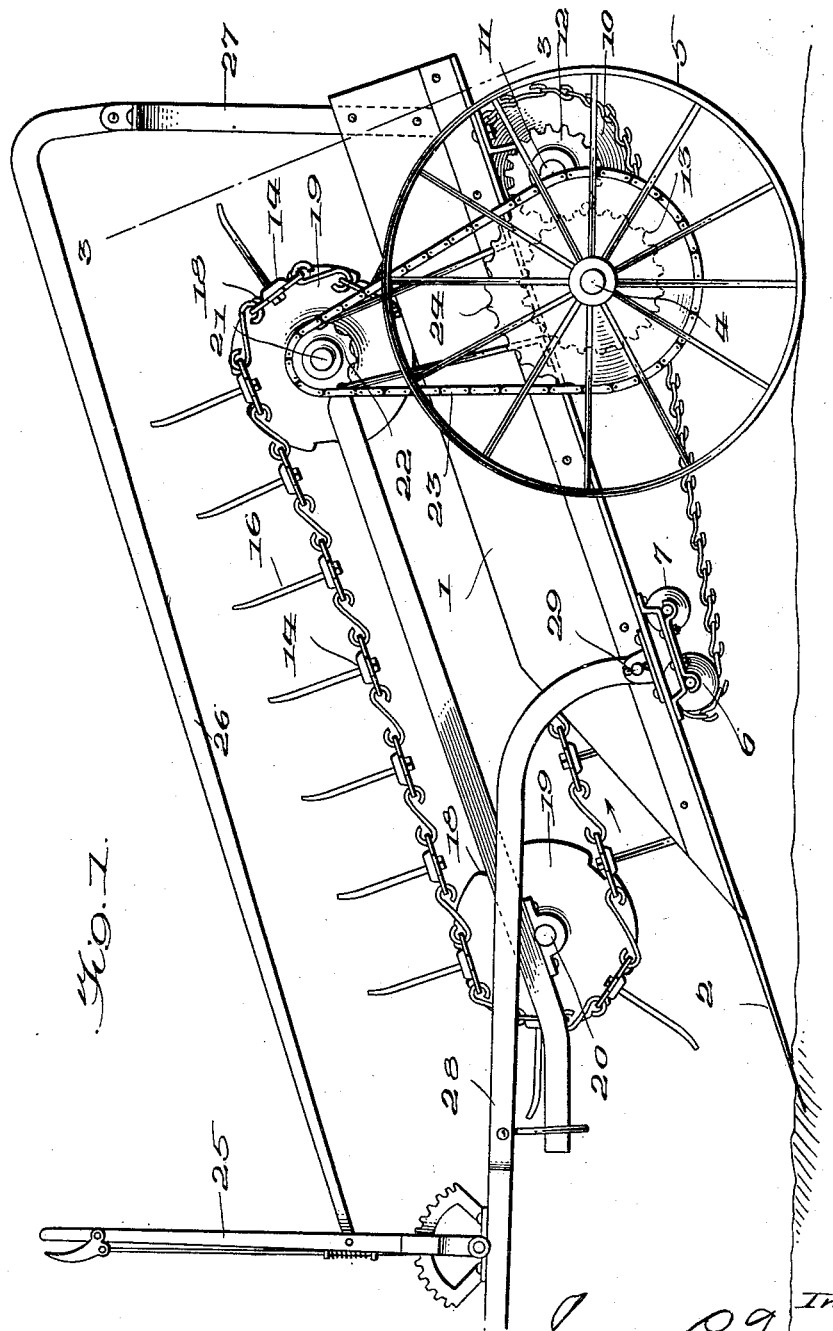

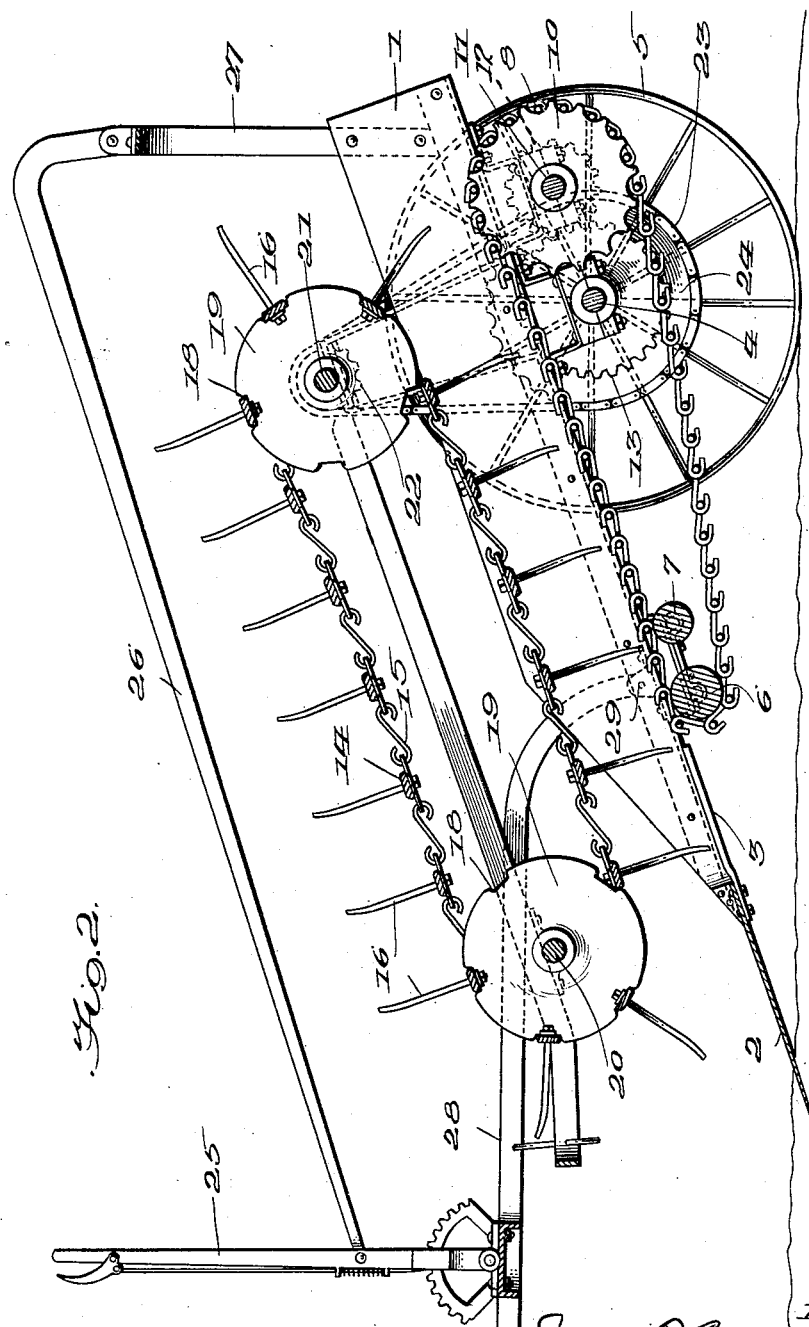

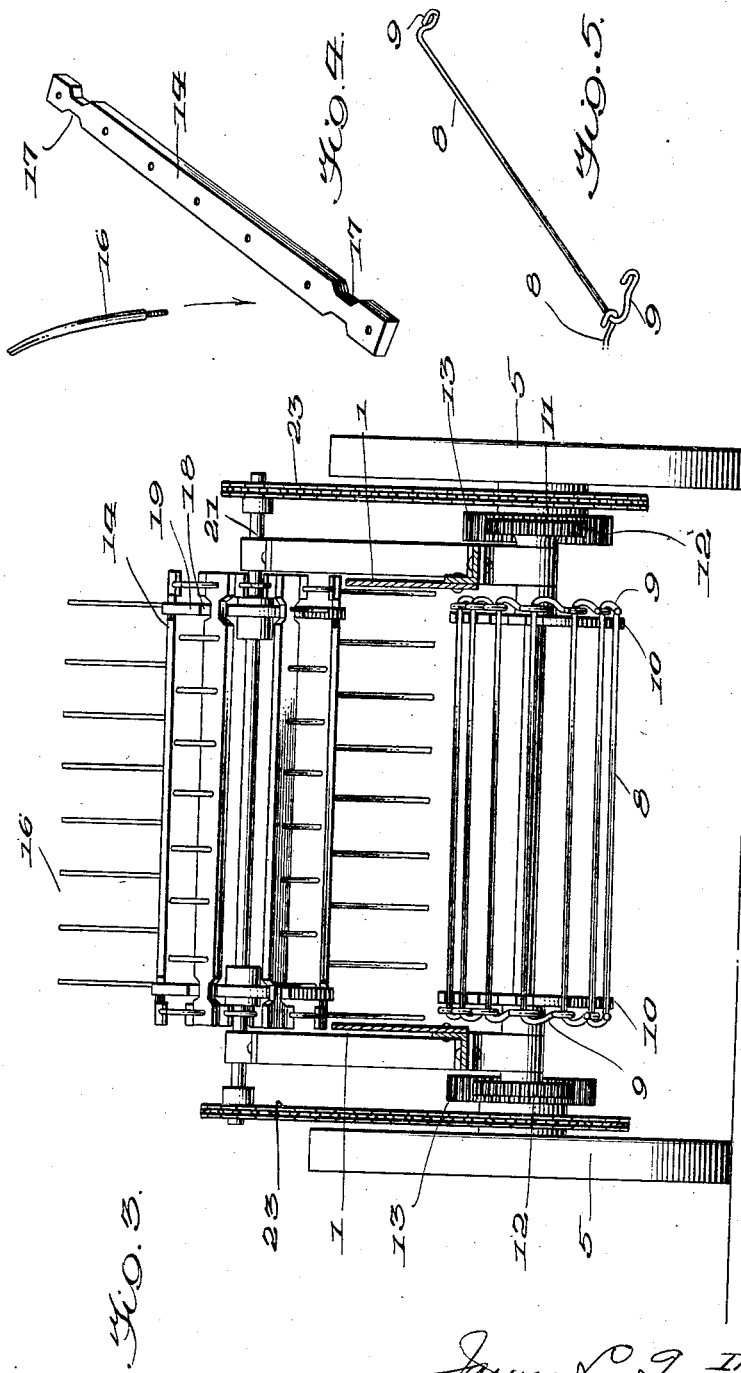

Patented June 21, 1932

1,864,382

UNITED STATES PATENT OFFICE

JAMES L. TWENTYMAN, OF CORTLAND, NEW YORK

POTATO DIGGER

Application filed February 8, 1929. Serial No. 338,528.

My invention relates to an improvement in potato diggers.

The difficulty with most machines for digging potatoes is that they are very heavy to haul while in operation, requiring a tractor in most instances, and this is not practicable for many farmers on account of the added cost, and the excessive weight of the machine is due in part, if not very largely to the great amount of unnecessary dirt carried by the machine during the process of separation of potatoes and soil.

This machine has been designed to overcome that objection. The machine is not only light in structure, but provision is made for disposing of the dirt just as soon as possible after it has been plowed up by the machine with the potatoes, and this is accomplished by providing a grating immediately back of the plow, and providing an endless moving rake which co-operates with the plow and grate and has the effect of stripping the potatoes from the soil and disposing of the soil almost immediately, so that it is not carried through the machine, adding to the weight and draft upon the animal hauling the same.

My improved machine will operate equally well on smooth and rough and even wet soil, with effective results, both in digging the potatoes and quickly separating them from the soil that is dug up with them by the plow.

In the accompanying drawings:

Fig. 1 is a view in side elevation;

Fig. 2 is a longitudinal sectional view;

Fig. 3 is a section on line 3—3 of Fig. 1, looking toward the left or the forward end of the machine;

Fig. 4 is a detached view of parts of the rake; and

Fig. 5 is a view in perspective of a portion of the potato-conveyer.

The trough-like body 1 is preferably made of sheet-metal and in any approved form, with a plow 2 at the forward end, and immediately adjacent to the rear end of the plow is the grate or grating 3 made up of bars running longitudinally from the rear end of the plow a short distance toward the rear, and the remainder of the frame has an open bottom.

The rear end of the frame is carried on an axle 4, the ends of which are supported in the hubs of the two tractor-wheels 5, one on either side, upon which the main part of the machine is supported and carried.

A chain extending over idlers 6 and 7 at the forward end is in the form of a sprocket-chain, preferably made up of individual rods 8 (see Fig. 5), the ends 9 of which are bent and hooked over the next rod, as illustrated in Figs. 2 and 5, and the chain thus formed extends around the sprocket-wheels 10, one on either side of the machine, and mounted on a shaft 11. Small gears 12 keyed on this shaft are meshed with larger gears 13 keyed on the main axle 4, and by means of which the potato conveyer is driven in clockwise direction as indicated in Figs. 1 and 2.

The foregoing features are in the main more or less well-known in the art. My contribution consists more particularly in a travelling-rake. This rake is in the form of an endless conveyer including cross-bars 14 and links 15. These cross-bars carry rake-teeth 16, which extend across the width of the machine. The drawings show about eight or nine of these to each bar, and on alternate bars they are staggered so that alternate rows of teeth travel forward in one vertical plane, and the others in another vertical plane. The bars 14 preferably have notches 17 at their ends as a means for entering the notches 18 in the disks 19. These disks 19 are keyed on shafts 20 and 21, and on the shaft 21 sprocket-wheels 22 are secured, and sprocket-chains 23 pass around the sprocket-wheels 22, and also around larger sprocket-wheels 24 keyed on the main axle 4, so that the rake is driven from the main axle in a counter-clockwise direction as indicated by the arrow in Fig. 1. Thus the speed of the endless rake is much greater than the speed of the machine and of the endless potato-conveyer at the bottom of the machine.

The function of the rake is to loosen the earth from the potatoes immediately after the dirt and potatoes are dug from the ground, and the rake-teeth 16 pass through the dirt and potatoes in rapid succession as they are dug and forced backward over the plow with the forward movement of the machine. The dirt thus separated from the potatoes is sifted out through the grating 3, and the potatoes are practically clean by the time they reach the forward end of the potato-conveyer, so that the bulk of the weight carried by the machine is disposed of almost immediately upon being dug from the ground. To accomplish this is the main object of my present invention.

By combing and re-combing through the mass of dirt and potatoes lifted from the soil, the rake-teeth insure a quick and complete separation, and the endless potato-conveyer forming the bottom of the machine naturally conducts the potatoes to the rear where they are discharged on the ground or in a receptacle if desired, gradually shaking out any remaining particles of dirt that may not have passed through the grating; but these presumably would be such a small percentage that it would be almost negligible since the major portion of the separation and sifting out occurs as the dirt and potatoes reach and leave the rear of the plow.

Ordinary means of raising, lowering and adjusting the position of the plow and other parts is illustrated in the way of a hand-lever 25, and a bar 26 extends from the lever to an upright 27 on the rear of the machine. This lever 25 is pivotally mounted on the draft-bar 28, and the latter is pivoted to the frame 1 of the machine at 29.

Thus I have provided a machine in which the separation of potatoes and dirt is practically completed immediately upon leaving the shovel or plow, thus almost instantly eliminating excess weight instead of carrying this burden of waste and unnecessary material throughout the length of the machine, or any considerable part of it, before disposing of it.

I claim:

1. In a potato digger, an endless rake having cross-bars, said cross-bars having notches in the opposite ends thereof, rake teeth carried by the cross-bars, links connecting the cross-bars together, and driving disks for the endless rake and having notches in the peripheries thereof receiving the notched ends of the cross-bars.

2. In a potato digger, an endless rake having cross-bars, said cross-bars having notches in opposite sides thereof at opposite ends, rake teeth carried by the cross-bars, links connecting the cross-bars together, and driving disks arranged at opposite sides and at opposite ends of the endless rake, each of said disks having notches formed in the periphery thereof and receiving the notched ends of the cross-bars.

3. In a potato digger, an endless rake having cross-bars, said cross-bars having notches in opposite sides thereof at opposite ends, rake teeth carried by the cross-bars, links connecting the cross-bars together, driving disks arranged at opposite sides and at opposite ends of the endless rake, each of said disks having notches formed in the periphery thereof and receiving the notched ends of the cross-bars, and means for driving said disks.

In testimony whereof I affix my signature.

JAMES L. TWENTYMAN.